March 11, 1958  B. J. JOHANSON  2,826,325
MOUNTING BRACKET FOR ELECTRIC SOCKETS
Filed Oct. 21, 1955
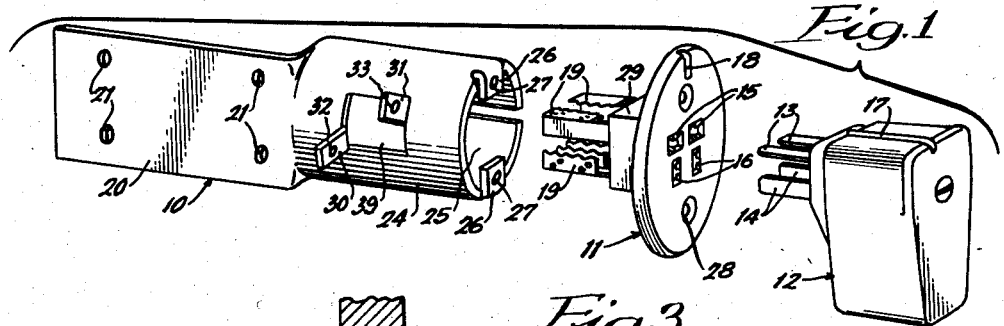
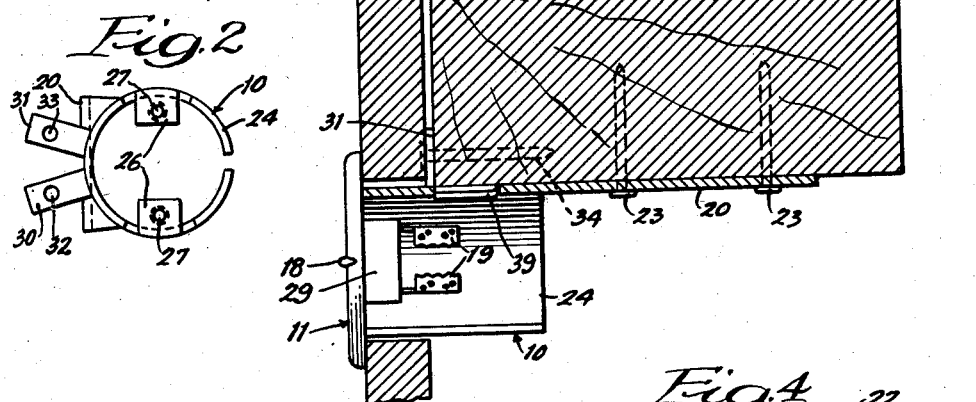
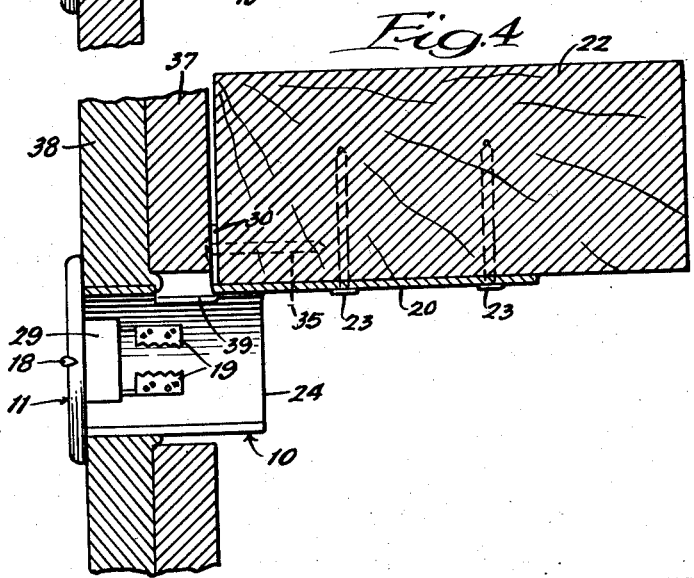
INVENTOR:
Bengt J. Johanson,
BY John Jodd
ATTORNEY

United States Patent Office 2,826,325
Patented Mar. 11, 1958

2,826,325

MOUNTING BRACKET FOR ELECTRIC SOCKETS

Bengt J. Johanson, Des Plaines, Ill., assignor to Cinch Manufacturing Corporation, Chicago, Ill., a corporation of Illinois Application October 21, 1955, Serial No. 542,075

4 Claims. (Cl. 220—3.7)

This invention relates to an electric socket structure, and more especially to a mounting bracket for an electric socket. The invention, by way of example, is useful in building structures in conjunction with electric convenience outlets in the walls thereof, and in particular to telephone convenience outlets of the character that will accommodate a simple plug-in connection of a telephone wherever the outlet is located.

In home dwelling units, there is an ever increasing need for a plurality of electric convenience outlets in the walls thereof because of the increasing use of various electric appliances. For example, there is a tendency today to provide a home with more than one telephone so that telephone extensions are located at convenient places about the home. An alternative to this arrangement is to provide a dwelling with a plurality of telephone outlets, for example, one or more in each room, so that then a single telephone may be carried about and located wherever it is most advantageous or convenient at any particular time.

An arrangement such as this can be set up initially in new buildings as part of the construction thereof. While socket structures are available, so far as is known none are completely satisfactory in all respects, and in particular cannot be made to accommodate readily the variations in wall structures automatically as part of the installation thereof. For example, in new buildings the inner walls may be of lathing and plaster construction or they may be formed solely of wallboard. Sockets used as convenience outlets should be positioned so that that they are flush with the outer surface of the inner walls, and such positioning has in the past posed a number of problems.

There is a need for an electric socket structure that can be made to accommodate readily and substantially automatically differences in the inner wall construction of building structures, and it is accordingly an object of this invention to provide such a socket structure. Another object of the invention is in the provision of a mounting bracket for an electric socket to be used as a convenience outlet, and that is quickly and easily mounted and is provided with means for automatically determining the position thereof for wall constructions, whether of lath and plaster formation or wall board formation.

Still another object of the invention is in the provision of a mounting bracket adapted for use in the forming of a telephone convenience outlet and that is provided with a plurality of ears selectively removable in accordance with the particular type of wall structure to be employed, the ear remaining after the removal of the others forming a positioning device to insure a flush mounting of the outlet socket with the outer face of the wall—the selective removal of the ears being determined by the particular wall construction. A further object is to provide a mounting bracket adapted for use with a telephone convenience socket adapted to be secured to a wall stud with a predetermined portion of the bracket projecting forwardly therefrom, the extent of the forward projection being determined by the wall structure and being positively measured by means carried by the bracket itself. Yet a further object is to provide a mounting bracket of the character described having a tongue adapted to be nailed or otherwise secured to a face of a wall stud, and having a projection or holder in the form of a mounting cage of tubular configuration adapted to receive terminals of a telephone convenience socket therein, and having struck in opposite directions from adjacent surfaces laterally extending ears that are spaced apart and lie along radial lines emanating from the longitudinal axis of the tubular cage, the spaced ears being oriented so that they can be selectively brought against the outer edge of a wall stud and thereby determine the extent of the tubular cage extending forwardly thereof to correspond that projection with the character of the wall construction. Additional objects and advantages will become apparent as the specification develops.

An embodiment of the invention is illustrated in the accompanying drawing, in which—

Figure 1 is a perspective view showing the components of a telephone convenience socket structure in spaced apart relation; Figure 2 is an end view in elevation of the mounting bracket illustrated in Figure 1; Figure 3 is a longitudinal sectional view taken along the longitudinal axis of the socket and showing it in position in a building wall, that wall being of wallboard construction; and Figure 4 is a longitudinal sectional view similar to that of Figure 3, but showing the socket structure in position in a wall wherein the wall is of lath and plaster construction.

Figure 1 illustrates all of the components of a socket structure embodying the invention, and the socket structure there illustrated is adapted for use in conjunction with a telephone system. The socket comprises a mounting bracket 10, a convenience outlet per se or female socket 11, and the plug 12. The plug 12 is adapted to be connected to the end of a cord leading to a telephone instrument, and that instrument can be readily carried from place to place and the plug 12 inserted into the outlet 11 to complete the circuit to the telephone.

It is seen in Figure 1 that the plug 12 is provided with a plurality of terminals—there being four in number—two of which, identified by the numeral 13, are oriented in a horizontal plane, and the other two, which are designated with the numeral 14, being positioned in vertical planes. These terminals will be connected to the cord (not shown) leading from a telephone instrument. These terminals are adapted to be removably received within corresponding horizontal openings 15 and vertical openings 16 in the socket 11. Because of the specific positioning of the terminals and openings, the plug can be inserted into the outlet when in but one predetermined position. For facility in aligning the terminals properly with the openings or receptacles in the outlet, the plug 12 may be provided with a marker 17, and the outlet provided with a corresponding marker 18, these markers when in alignment providing indicia that the terminals are aligned for insertion into the receptacles of the outlet.

Figure 1 also shows that the outlet 11 is provided with four terminal connectors designated with the numeral 19, and these are adapted to receive the wires of the telephone circuit and to provide an electric connection therewith. These terminal connectors extend into the socket outlet 11 and define the openings 15 and 16 into which the terminals of the plug are inserted, and thereby establish an electric connection between the terminals of the plug and the lead wires of the telephone circuit.

The mounting bracket 10 comprises a flange or tongue 20 that is generally rectangular, and is preferably provided with three or more apertures 21 therethrough that are adapted to receive nails employed in securing the mounting bracket in position upon a bulding wall stud, as is shown in Figures 3 and 4. In each of these illustrations, the wall stud is designated with the numeral 22, and the nails which pass through the apertures 21 and are driven into the wall stud are designated with the numeral 23. It is apparent that the flange or tongue 20 is adapted to lie against the face of the building wall stud.

Formed integrally with the tongue 20 is a projection or holder 24 in the form of a mounting cage of tubular configuration. As is most apparent from Figures 2 through 4, the mounting cage along one side thereof lies in the plane of the tongue 20, but otherwise is offset therefrom. The mounting cage 24 has an open forward end 25 and inwardly turned lugs 26, preferably oriented 180° apart. The lugs 26 are each provided with a threaded opening 27 therethrough alignable with corresponding openings 28 provided in the front panel of the socket 11. The openings 28 are adapted to pass screws therethrough which are threadedly received within the apertures 27 to firmly anchor the socket outlet 11 to the mounting bracket 10.

Preferably, the polygonal boss 29 carried by the socket outlet 11 is rectangular, one dimension thereof being such that it may be readily inserted between the inwardly turned lugs 26 of the mounting bracket, while the other dimension is greater and prevents insertion between the ears of the mounting bracket. By this means, the socket outlet 11 can be located in either one of two positions with respect to the mounting bracket—or in the specific showing of Figure 3, the outlet 11 may be positioned as illustrated or it may be rotated at 180°, and in either event, the boss 29 can be inserted between the lugs 26.

The mounting cage 24 is also provided with a pair of laterally extending ears 30 and 31 which are provided, respectively, with aparteures 32 and 33 therethrough. The ears 30 and 31 extend laterally from the mounting cage 24 along the side thereof aligned with the tongue 20. These ears are employed selectively in securing the mounting bracket to a wall stud, and as shown in Figure 3, the ear 31 abuts the forward wall of the stud 22 and is secured thereto by a nail 34, while in the showing of Figure 4, the rear ear 30 is abutting the forward face of the stud 22 and is secured thereto by a nail 35.

The structural arrangement shown in Figure 3 is a building wall wherein the inner surface thereof comprises wallboard panels 36. As is well known, this type of construction is generally referred to as dry wall construction. In the showing of Figure 4, the inner surface of the wall there disclosed comprises lathing 37 covered by finishing plaster 38. The lathing 37 can be metal or wood or take any other form, or in fact might even be dry board panels such as the panels 36 illustrated in Figure 3. In any event, the finishing layer comprises a layer of plaster 38, as shown. It is apparent from Figures 3 and 4 that in either type of construction, the convenience outlet 11 is flush with the outer surface of the wall, and in each case the mounting bracket 10 is secured to the wall stud 22 both along the side face and front or outer surface thereof.

The ears 30 and 31 are positioned along the cage 24 so that the ears can be brought selectively against the forward surface of a wall stud 22, and thereby establish the amount or length of the cage 24 that projects forwardly of the stud. When dry wall construction is employed, as shown in Figure 3, the ear 31 is brought against the forward surface of the stud 22, and the cage then projects just far enough in front of the stud so that the outer end thereof is substantially flush with the outer surface of the dry wall panel 36. On the other hand, where a plaster wall construction is employed, the ear 30 is brought against the forward face of the building stud, and that portion of the cage that then projects forwardly of the stud corresponds in thickness to substantially that of a plaster wall coating and the lathing thereunder. The ears 30 and 31 are adapted to be selectively broken off; and when the ear 30 is used as a positioning member, ear 31 is snapped off, and vice versa. The ears may be broken along the line of joinder with the tubular wall of the cage 24 by grasping either ear with a pliers and bending it back and forth once or twice. Preferably, to facilitate the breaking of the ears, the line of severance with the tubular surface of the mounting cage may be weakened by partial severance thereof in a stamping operation. As is most apparent from Figure 2, the ears 30 and 31 fan outwardly and lie along radial lines having their point of origin along the longitudinal axis of the tubular cage. The ears then are spaced quite far apart along their outer edges, and this spacing facilitates gripping and bending either of the ears with a pliers or similar tool without the other ear interfering with the bending movements.

The mounting bracket 10 is an integral unit and is stamped from a flat sheet of material. The dimensions, apertures and other components may all be formed in a single stamping operation, and the mounting cage then formed as part of such operation or as a separate, succeeding operation. The ears 30 and 31 are cut from a single slot and have the same lengths and widths. It will be appreciated that the length of the ears determines the spacing therebetween when they are bent laterally, and those lengths then in effect determine the extent of the mounting cage that will project forwardly of the wall stud 22. For identification, the opening or slot remaining after the ears 30 and 31 are struck laterally is designated with the numeral 39.

While in the foregoing specification an embodiment of the invention has been illustrated in considerable detail for purposes of making a complete disclosure, it will be readily apparent to those skilled in the art that numerous changes may be made in those details without departing from the spirit and principles of the invention.

I claim:

1. In a socket structure adapted to provide a convenience wall outlet for telephone circuits and the like, a mounting bracket adapted to be rigidly affixed to a wall stud and to provide a rigid mounting for a socket outlet, said mounting bracket comprising a generally cylindrical mounting cage having at its forward end a pair of spaced apart, inwardly turned lugs apertured for receiving screws to secure a socket outlet thereto, said cage having intermediate the ends thereof a pair of longitudinally spaced ears extending laterally therefrom, each of said ears being adapted to be repetitiously bent along the lines of connection to said cage to effectuate a severance therealong, and an elongated tongue extending rearwardly from said cage and formed integrally therewith, said tongue being adapted to be secured to the face of a wall stud while one of said ears is secured to the forward surface thereof, said ears being positioned a distance from the forward end of said cage corresponding to the thickness of a typical dry wall and plaster wall structure.

2. The structure of claim 1 in which said mounting bracket is stamped from a single sheet of material and in which said ears are struck laterally from a single slot, said ears being drawn into a diverging relation with respect to each other so as to lie along radii of said cage when the cage is formed into a generally cylindrical shape.

3. A mounting bracket adapted for use in a wall socket structure, comprising a relatively flat tongue adapted to be secured to the face of a wall stud, a generally tubular mounting cage integral with said tongue and having its longitudinal axis offset laterally therefrom, a pair of apertured lugs carried by said cage adjacent the forward end thereof for use in securing a socket outlet to said cage, a pair of ears disposed at spaced apart points longitudinally along said cage, each said ears being connected to said cage along lines adapted to provide a line of severance when the ears are bent thereabout, said ears being positioned respectively distances measured from the forward end of said cage corresponding to dry wall and plaster wall thicknesses.

4. The structure of claim 3 in which said ears are struck laterally from a single slot in said tubular cage and lie respectively along radii of the tubular cage.

References Cited in the file of this patent

UNITED STATES PATENTS

| | | |
|---|---|---|
| 1,090,805 | Wagner | Mar. 17, 1914 |
| 1,400,155 | Greenburg | Dec. 13, 1921 |
| 2,126,114 | Jett | Aug. 9, 1938 |
| 2,214,968 | MacMillen | Sept. 17, 1940 |
| 2,286,898 | Cover | June 16, 1942 |